July 7, 1970 F. WALDA 3,519,147
SHIP LOADING AND UNLOADING
Filed April 1, 1968 6 Sheets-Sheet 1
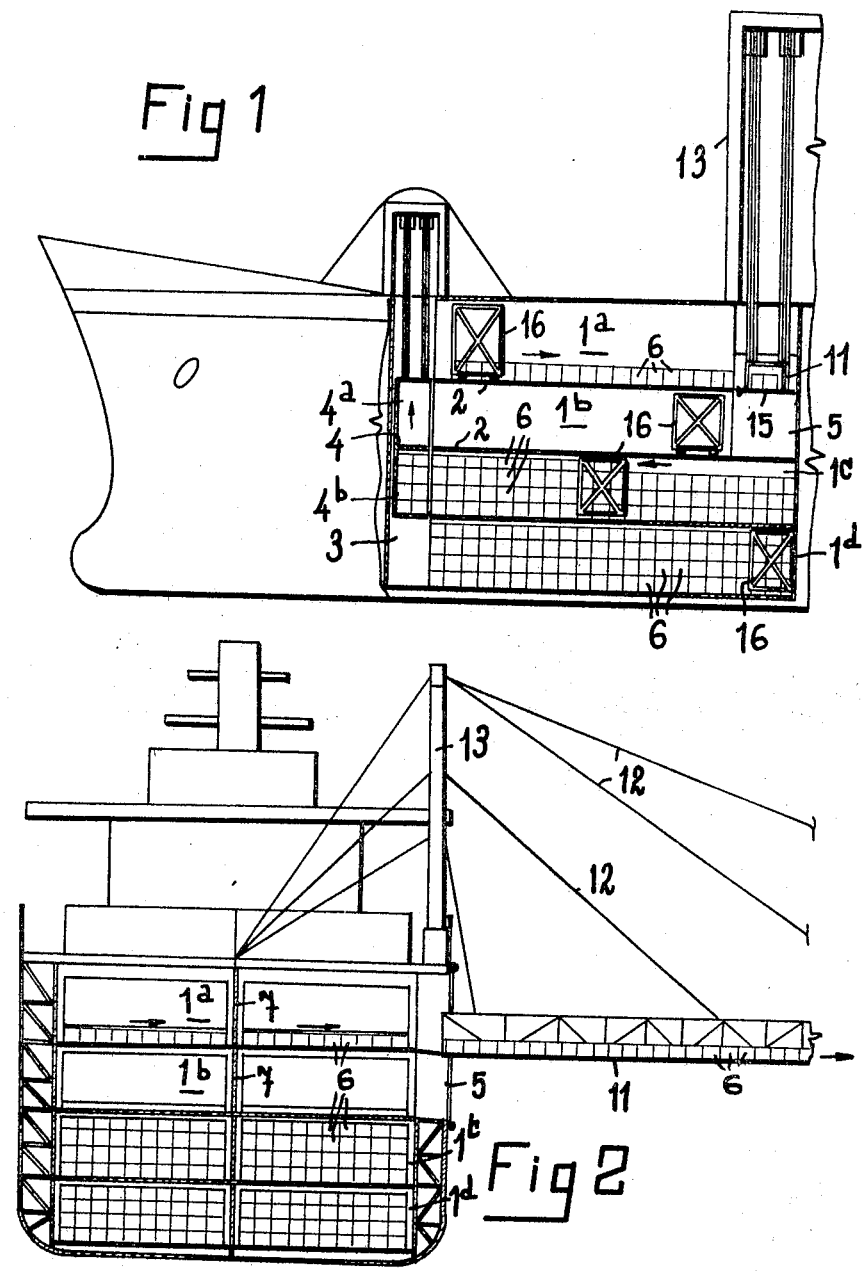

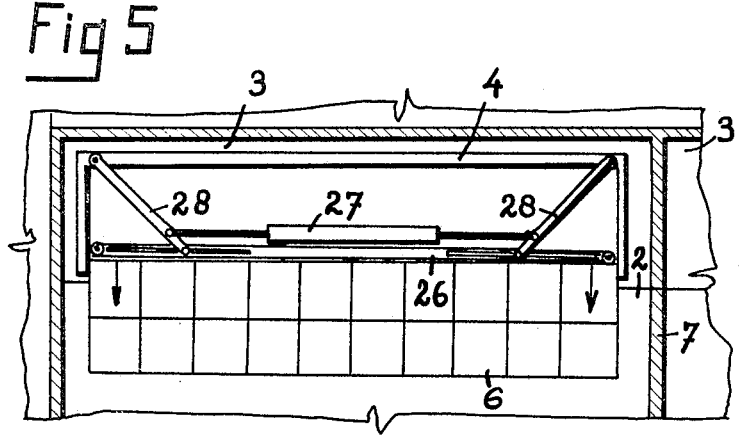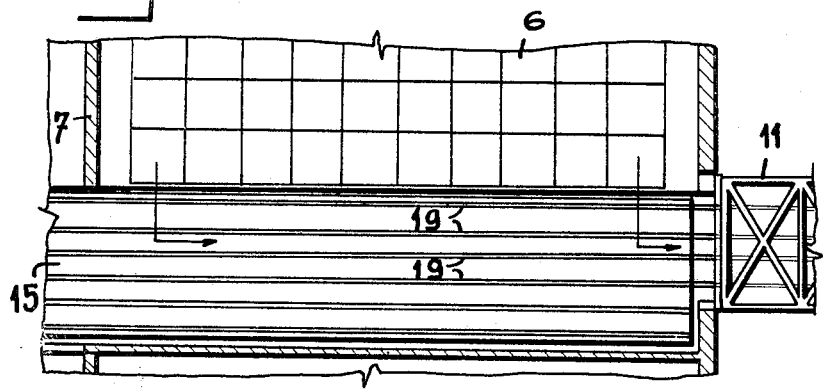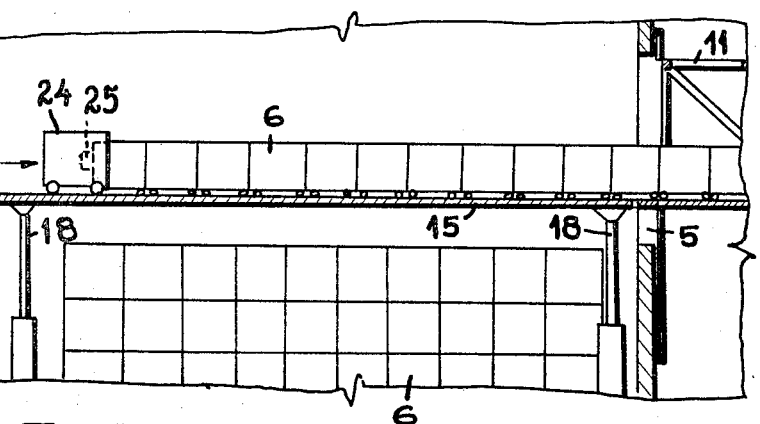

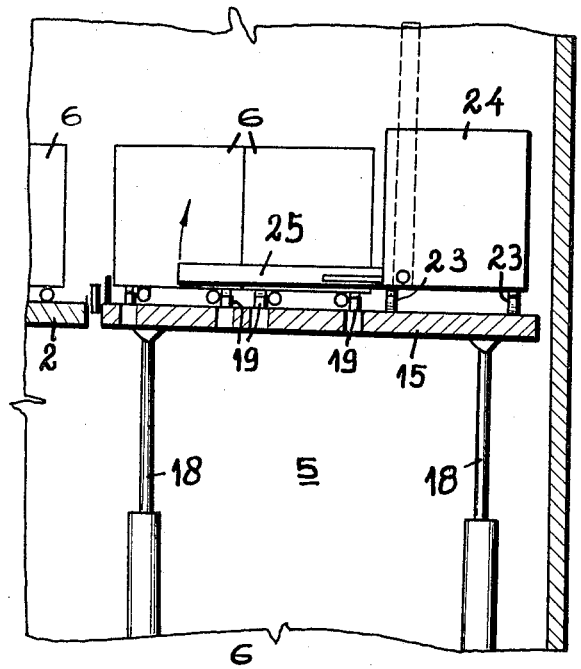
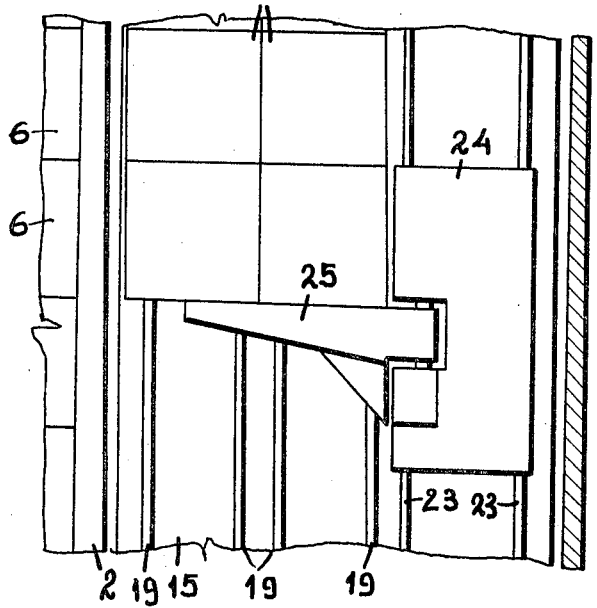

United States Patent Office 3,519,147
Patented July 7, 1970

3,519,147
SHIP LOADING AND UNLOADING
Fedde Walda, 15 Leendert Sparreboomstraat,
Rotterdam, Netherlands
Filed Apr. 1, 1968, Ser. No. 717,623
Claims priority, application Great Britain, Mar. 31, 1967,
14,920/67
Int. Cl. B65g 67/58
U.S. Cl. 214—15
3 Claims

ABSTRACT OF THE DISCLOSURE

A ship having a plurality of superimposed holds, separated by decks, for stowing containers, has two superimposed hatch openings which lead through the side of the ship into two of the holds. Apparatus is provided for loading or unloading the ship with containers in groups each of which comprises a row of containers extending athwartship across the width of a hold. The apparatus permits such groups of containers to be loaded or unloaded in an uninterrupted succession, using the two hatch openings alternately. While one hold is being loaded or unloaded through its hatch opening, the second hold having a hatch opening is being prepared for loading or unloading by transferring the containers between that hold and a third hold, by means of an elevator which connects the superimposed holds and extends laterally across the width of the holds so as to receive a row of containers extending across the width of the hold. The two hatch openings are located at a point remote from the elevator, and separate pusher apparatus is provided in each hold for moving a layer of containers longitudinally in order to move successive rows of containers to and from the elevator, or in order to move successive rows of containers to or from a position in front of a hatch opening.

The present invention relates to a ship for the storage and transport of cargoes packed in containers, which is provided with apparatus for loading and unloading containers.

The transport of cargoes occurs nowadays more and more in closed containers which can be loaded in the holds in the form of a closed box. The dimensions of such containers, however, are so large that only one or two of such containers can be loaded on a deck or in a railway car. It is difficult to locate containers having such large dimensions in the holds of a ship since each container has to be lowered in and lifted out of the ship's hold individually by means of a crane, and such big containers have to be placed in the right position in the ship's hold by manpower.

It has appeared, therefore, to be desirable to transport the cargo in containers of relatively smaller dimensions. However, loading and unloading such small containers by means of a crane would require too much time.

SUMMARY OF THE INVENTION

The object of the invention is to provide a ship adapted for the transport of containers having relatively small dimensions, the ship being equipped such that loading and unloading the ship can take place within a minimum period of time. According to the invention a ship is provided for the storage and transport of cargoes packed in containers characterized in that the ship is provided with holds vertically separated by decks, said holds mutually communicating by means of a shaft in which an elevator is movable. At least two holds situated above the ship's waterline are provided with a hatch or door in the hull of the ship. In a practical embodiment of the present invention the elevator extends horizontally over the entire width of each hold.

Further in accordance with the invention the ship is constructed such that behind the hatches in the hull of the ship a platform is provided which is vertically movable in the ship's hold, whereas an external bridge can be slid through the hatch into a space left above the platform when this rests on the deck of the ship's hold concerned said bridge serving as a transport bridge for the containers to be loaded in the ship's hold or to be unloaded therefrom.

Rows of containers extending over the entire width of the ship's hold can be advanced subsequently in a continuous stream through the hatch and over the platform, and each row of the containers is moved over the deck in the direction of the elevator or liftcage until the total area of the deck of the ship's hold concerned is completely covered with containers. The platform behind the hatch in the hull of the ship is then put at the level of the top of the first layer of containers. The top of each container is provided with intercommunicating rails so that rows of containers can be advanced again over the first layer into the ship's hold. In this manner a number of layers of containers can be placed one on top of the other in the hold by means of the vertically movable platform so that a complete filling of the hold is possible.

A second hold is hereafter filled in the same manner but during the loading of the second hold the containers of the first loaded hold are moved by means of the lift to a hold situated under the waterline. At the moment that the first hold is completely emptied, the hold under the waterline has meanwhile been filled completely with containers by means of the lift or elevator. The displacement of the cargo of containers in the ship's interior takes place during the loading of another hold. The operations for unloading a ship are quite similar but are reversed. Therefore a method for loading and unloading a ship according to the invention is characterized in that first a hold provided with a hatch that is situated above the waterline of the ship is loaded or unloaded, and that then a second hold situated above the waterline is loaded or unloaded and that simultaneously with the loading or unloading of said second hold a hold situated under the waterline is loaded or unloaded through said first hold by means of a lift.

Assuming that each cubic-shaped container has an external dimension of 1.20 m., a ship of 60,000 tons can comprise about 51,200 containers and can be loaded or unloaded in about five hours and twenty minutes by means of a bridge fitting in the space above the platform behind the hatch which bridge can be guided through the hatch beyond the ship.

BRIEF DESCRIPTION OF THE DRAWINGS

FIG. 1 is a side-view of a portion of a ship in accordance with the invention in which part of the hull of the ship is broken away to make the ship's holds visible;

FIG. 2 is a cross-section of the ship as illustrated in FIG. 1;

FIG. 5 is a plan view of a lift arranged in the lift cage;

FIG. 6 is a plan view of a platform cooperating with a hatch and a loading and unloading bridge;

FIG. 7 is an elevation thereof;

FIG. 8 is a cross-section or a large scale of the platform shown in FIGS. 6 and 7;

FIG. 9 is a plan view of the detail shown in FIG. 8;

DESCRIPTION OF THE PREFERRED EMBODIMENT

Figure 3:
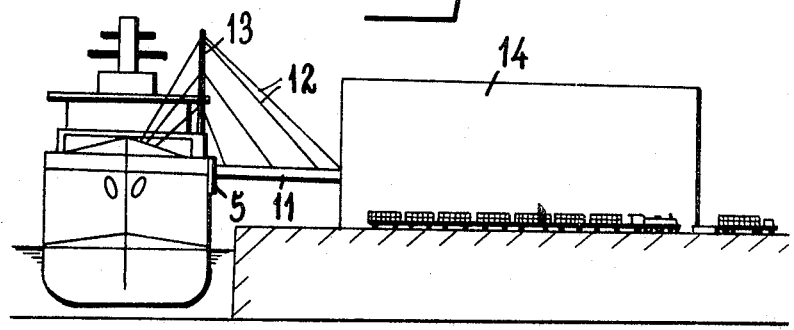
FIG. 3 is a schematic representation of a discharging-berth and a ship in accordance with the invention.

Referring to FIG. 1 the ship comprises four holds, 1a, 1b, 1c and 1d, situated one above the other and being separated from each other by decks 2. These four holds are interconnected by means of a lift-shaft 3 in which a lift or elevator 4 is movable. The height of the lift extends over the combined height of two holds. Therefore the elevator comprises an upper compartment 4a and a lower compartment 4b. The height of each compartment equals the height of each individual hold. The elevator 4 can be lifted to such a height that the compartment 4b is at the same level as for instance the hold 1a. Holds 1a and 1b are situated above the ship's waterline when the ship has its largest draught. Holds 1c and 1d, therefore, can be situated under the waterline. The cargo is exclusively allowed to enter into the holds 1c and 1d with the aid of the lift 4. Cargo is admitted in or out of the holds 1a and 1b through hatch openings 5 provided in the side wall of the ship. The hatch openings 5 can be closed by means of slidable hatches. Though not absolutely necessary both side walls of the ship can be provided with openings 5 closable by means of hatches.

A ship may comprise by way of example four pairs of holds 1a and 1b. Each hold may comprise for instance 800 containers being superimposed in four layers as indicated for the holds 1c and 1d. Holds 1a and 1b may comprise, therefore, 6,400 containers. So in the case of eight pairs of holds the ship can comprise 12,800 containers, so that the ship would have a loading capacity of about 16,000 tons.

Figure 10:
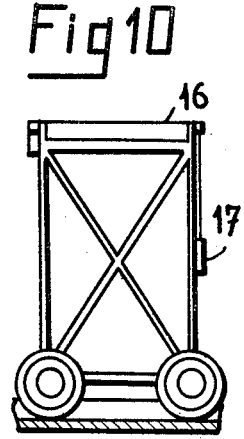
FIG. 10 is a schematic side-view of a pusher formed as a carriage to be used in the ship's holds.
Figure 11:
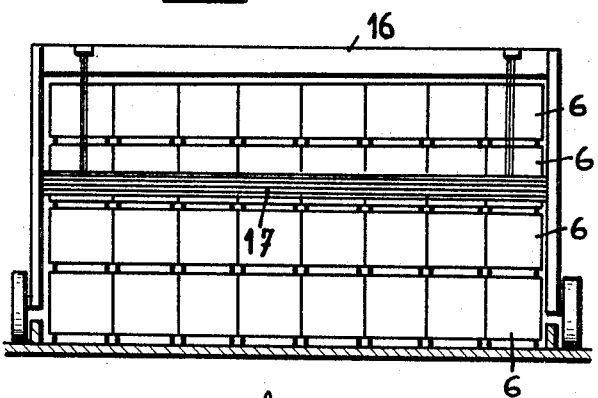
FIG. 11 is a schematic front-view thereof.
Figure 12:
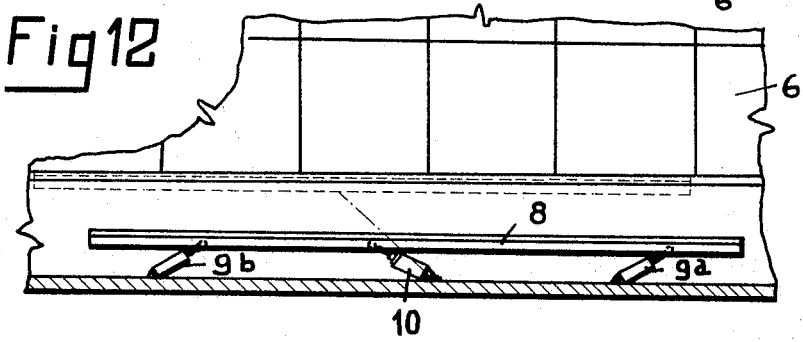
FIG. 12 is a schematic plan view of an attaching device for the containers.
Figure 13:
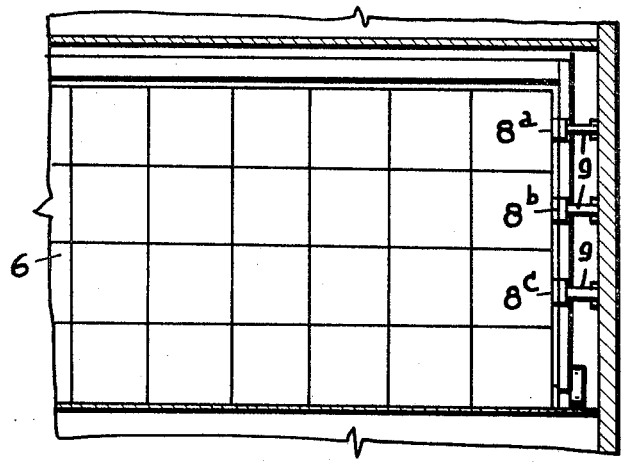
FIG. 13. is a schematic end view thereof.
Figure 14:
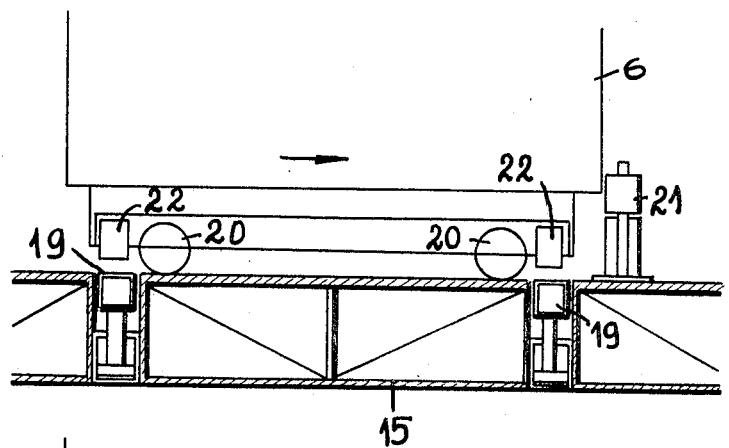
FIGS. 14, 15 and 16 show some details of a platform cooperating with a hatch in the ship's hull.

On each deck between the holds, rails are provided which are spaced apart and extending in the longitudinal direction of the ship on which rails the containers indicated in the drawings with reference numeral 6 can roll by means of rolls mounted under the containers. On top of the containers there are also provided rails which communicate with each other in the longitudinal direction of the ship so that various layers of containers can be located in a ship's hold in a super imposed relationship. Consequently the containers are located in juxtaposed and superimposed relationship in the form of blocks. In order to stow the containers for ocean shipment the holds 1a-1d are provided with a baffle running midway of the ship in its longitudinal direction. The baffle is clearly visble in FIG. 2 and indicated there with reference numeral 7. To be able to pack the cargo, i.e. the containers resting on rolls in rails, tightly for ocean shipment, a pressing device is arranged in the side wall of the ship as shown in FIGS. 12 and 13. The pressing device consists for example of a horizontally movable beam 8, attached to the ship's construction by means of hinged arms 9a and 9b. The beam 8 can be pressed against the containers 6 by means of a hydraulic jack 10. For each layer of containers 6 there is provided a beam and such beams are indicated in FIG. 13 with reference numerals 8a, 8b and 8c. The beam 8 can also be utilized for placing the rails on top of the containers in exact alinement so that a further layer of containers can be placed on the containers already disposed in the hold. The containers are then pressed at the same time against the longitudinal middle baffle 7 so that the containers are prevented from sliding any more. Loading and unloading bridges 11 can be slid into the ship through the hatch openings 5 and are suspended by means of cables 12 on a mast 13 of the ship. The roller bridge 11 may extend into a sorting dump 14 to sort the containers out as for destination to which they are to be transported for instance by rail or by road. The roller bridges 11, however, may also be inclined so that they can reach to the soil of for instance a storage yard. The loading and unloading bridges 11 can be slid into the spaces behind the hatch openings 5 when the roller bridges are inoperative. Thus the ship is made independent of the dock accommodation. A platform 15 (FIGS. 6 and 7) is provided in the space behind the hatch opening, said platform cooperating with the loading and unloading bridge 11. The unloading of the ship is effected as follows:

The pressing beams 8 are pressed away from the containers 6 by means of the hydraulic jacks 10 and against the ship's hull. Thus a gang way is obtained between the containers and the ship's hull in which rails of a larger size are provided. On these rails transversely buck-shaped electrical push carriages 16 are supported (FIGS. 10 and 11). With the aid of these push carriages the containers can be moved over the entire length of the ship's holds. To this end a vertically adjustable pushing beam 17 is mounted on these carriages which can be adjusted at the height of a layer of containers to be unloaded. In the ship's hold 1a as represented in FIG. 1 the cross beam 17 of the pusher 16 is in the lowest position to push the lowest layer of containers 6; in the ship's hold 1c the cross beam 17 is in the highest position to move the upper layer of containers 6 by means of the pusher 16. The pusher shown more in detail in FIGS. 10 and 11 has the shape of a portal and the cross beam 17 is supported on both upright ends of the portal. In FIG. 11 the cross beam 17 is in a position to move a third layer of containers. The containers are pushed in the direction of the platform 15, layer by layer.

Figure 4:
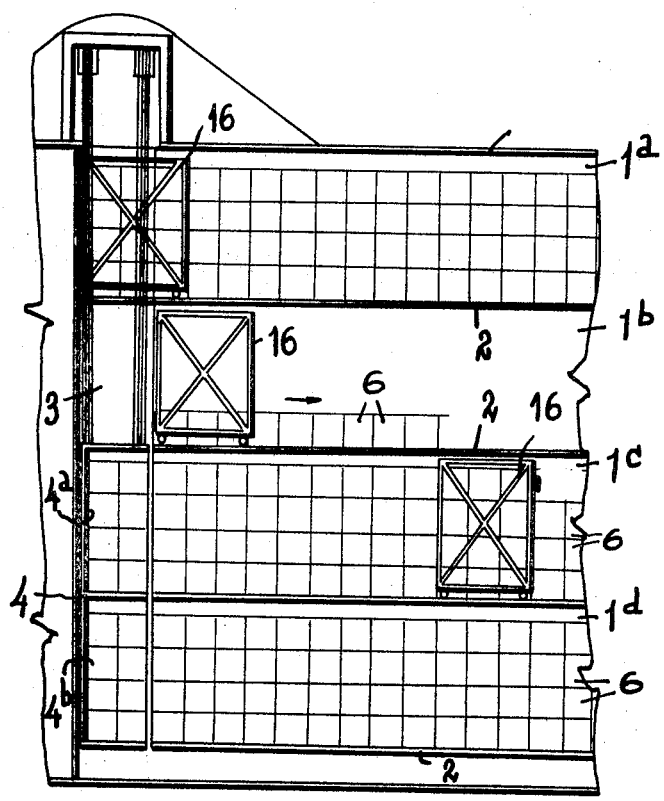
FIG. 4 is a detailed view of part of the structure shown in FIG. 1 at the place of the liftcage.
Figure 15:
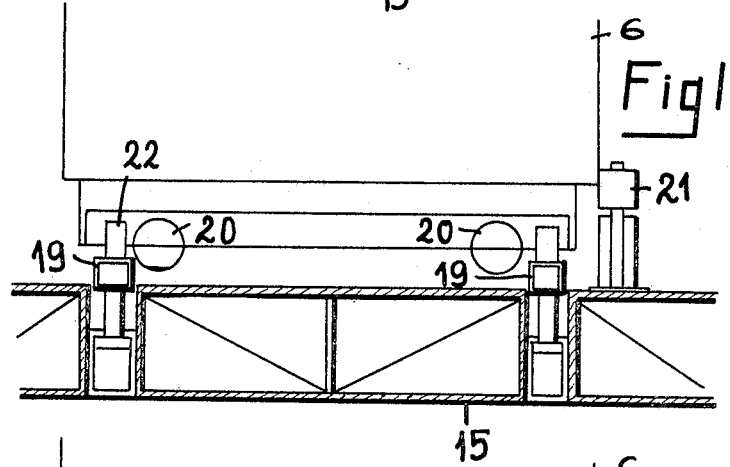
Figure 16:
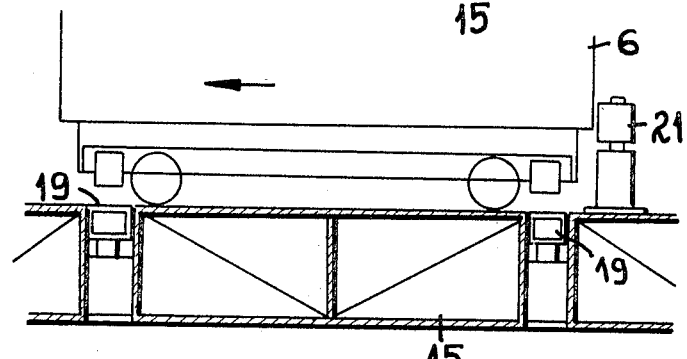

The containers ride in that case by means of their rolls over the rails situated thereunder either on rails provided on top of the containers or on rails provided on the deck of the hold. The platform 15 supported by hydraulic jacks 18 is moved to the height of the layer of containers being unloaded and one or two rows of containers 6 roll onto this platform. The platform is provided with upwardly movable transverse rails communicating with the loading and unloading bridge 11. These transverse rails are indicated in FIGS. 6 and 14, 16 and 15 with reference numeral 19. As soon as the containers 6, rolling with their rolls 20 over the platform 15, bump against a switching device 21 the rails 19 move upwards until they bump against transverse rolls 22 of the containers 6 thereby causing the containers with their rolls 20 to be lifted slightly as is shown in FIG. 15. By means of the rolls 22 the containers can now be moved over the rails 19 to the loading and unloading bridge 11. This is effected by means of a pusher 24 (FIGS. 7, 8 and 9) running over rails 23 of the platform 15. This pusher 24 has tiltable arm 25 to push the containers 6 towards the loading bridge. Arm 25 is tiltable so that during the returning movement of the pusher 24 other containers can already be rolled from the ship's hold onto the platform 15. A conveyor with endless belt and having upright pins is provided in the loading and unloading bridge 11 to brake or advance the containers depending on the slope which has been given to the loading or unloading bridge. In this way the transportation of the containers over the loading and unloading bridges will not be hampered by the tide or the variable height of the docks in the various harbours. If for instance one of the holds 1a and 1b has been completely unloaded, the containers are moved from hold 1c to this hold already unloaded, by means of the lift 4 in the shaft 3. Simultaneously the containers are pushed in the lift by means of the pusher in hold 1c and every time that the one or two rows of containers are placed in the lift the latter is adjusted over the height of the containers, so that next rows of containers can be superimposed. If four layers of containers can be superimposed in the holds, every compartment of the lift 4 can also comprise 4 superimposed layers of containers. Each compartment of the lift 4 is provided with four pusher beams 26 (FIG. 5) which in combination with a hydraulic jack 27 and hinging arms 28 can push the containers layer by layer into the holds already unloaded. When the first hold has been unloaded the platform 15 is brought at the level of the next hold so that a further hold can be unloaded again in the same manner as indicated heretofore. Thus the holds under sea-level are unloaded by means of the lift through the upper holds situated above the waterline. This process is illustrated in FIG. 4 in which hold 1b has been unloaded whereas hold 1a is going to be unloaded. The containers are moved by means of the lift 4 layer by layer from hold 1c to hold 1b already unloaded. When the hold 1b has been filled completely with containers from hold 1c, the unloading of hold 1a will also be finished so that containers from hold 1d can be moved towards hold 1a during the unloading of hold 1b. The unloading can be effected completely in an automatic way and controlled if necessary by the ship's crew or with the aid of television cameras. Additional staff of the docks is therefore not necessary for the loading of the ship.

I claim:

1. A ship having a plurality of superimposed holds, separated by decks, for stowing containers, and apparatus for loading and unloading the containers in groups each of which comprises a row of containers extending athwartship across the width of a hold, such apparatus comprising an elevator shaft which vertically connects a plurality of superimposed holds and extends laterally across the width of such holds, and an elevator in such shaft which extends across the width of such holds, wherein the improvement comprises two superimposed hatch openings which lead through the side of the ship into two of such holds and are located at a point remote from the elevator, apparatus for selectively expelling through each of the hatch openings a row of containers extending across the width of a hold, and separate pusher apparatus in each hold for moving a layer of containers longitudinally in order to move successive rows of containers to and from the elevator in transferring containers from a first hold to a second hold while simultaneously transferring successive rows of containers through the hatch opening of a third hold.

2. A ship according to claim 1, wherein the apparatus for moving a layer of containers longitudinally in each hold is adapted to move only the top layer of a plurality of superimposed layers of containers, and a vertically movable platform is provided opposite the hatch openings, extending across the width of at least one hold.

3. A ship according to claim 2 comprising a bridge which is adapted to transport containers between the hatch opening and a dock and is adapted to be stored, when not in use, on top of the vertically movable platform.

References Cited

UNITED STATES PATENTS

| 929,139 | 7/1909 | Rirchner. | |
|---|---|---|---|
| 1,084,630 | 1/1914 | Hawthorn. | |
| 1,900,867 | 3/1933 | Olds. | |
| 3,077,269 | 2/1963 | Jacobs et al. | 214—15 |

FOREIGN PATENTS

| 806,098 | 12/1958 | Great Britain. |
|---|---|---|
| 953,530 | 3/1964 | Great Britain. |

GERALD M. FORLENZA, Primary Examiner

F. E. WERNER, Assistant Examiner

U.S. Cl. X.R.

214—16.4